United States Patent [19]

Gealt

[11] 4,006,640
[45] Feb. 8, 1977

[54] SEAL FOR PROCESS PRESSURE TO CURRENT TRANSMITTER

[75] Inventor: Arthur E. Gealt, Philadelphia, Pa.

[73] Assignee: Honeywell Inc., Minneapolis, Minn.

[22] Filed: Feb. 6, 1976

[21] Appl. No.: 655,855

[52] U.S. Cl. .................................. 73/393; 92/1
[51] Int. Cl.² .................................. G01L 19/04
[58] Field of Search ............ 73/407 R, 406, 393, 73/398 R, 398 AR; 92/1, 98

[56] References Cited
UNITED STATES PATENTS 3,623,371 11/1971 Jullien-Davin ................. 73/393

Primary Examiner—Donald O. Woodiel
Attorney, Agent, or Firm—Laurence J. Marhoefer; Lockwood D. Burton; Mitchell J. Halista

[57] ABSTRACT

A pressure to current transmitter has an internal fill fluid chamber separated from a process fluid by a diaphragm and backup plate. A fluid-tight seal is achieved between the backup plate and the wall of the fluid chamber by a continuous weld bead while the wall of the chamber is arranged on a flexible cantilever to accommodate differential thermal expansion between the backup plate and the chamber wall.

10 Claims, 4 Drawing Figures

SEAL FOR PROCESS PRESSURE TO CURRENT TRANSMITTER

BACKGROUND OF THE INVENTION

1. Field of the Invention

This invention relates to a fluid pressure to electrical signal transmitter, and more particularly to an improved welded fluid tight seal between the diaphragm backup plate and fill fluid chamber.

2. Description of the Prior Art

Conventional prior art, pressure to current transmitters have four parts: namely, a process head arranged to receive into an internal cavity, a process fluid pressure under measurement, a flexible diaphragm and diaphragm backup plate used to form a flexible, fluid-tight side of the cavity within the process head, a center body having a fluid chamber located adjacent to the diaphragm and backup plate and containing a captive fluid through which pressure changes in the process fluid under measurement are transmitted from the diaphragm to a strain gauge in the fluid chamber, and a base portion arranged to protect electrical connections to the strain gauge for carrying a transmitter output signal to a remote measuring or controlling device. The four pieces of the process head are held in a fluid-tight stack by conventional nut and bolt connectors.

A resilient O-ring seal is employed in the aforementioned prior art devices between an outer face of the diaphragm backup plate and an outer mating face of the fluid chamber to prevent leakage of the captive fluid from the fluid chamber while allowing a pressure transmitting motion of the diaphragm.

Such an O-ring seal often suffers from several inherent problems, including non-uniform thickness defects, improper assembly producing defective seating and corrosion due to the chemical action which takes place between the captive fluid and the O-ring. These problems, either singly or in combination, can cause the O-ring to loose its proper sealing characteristic resulting in an undesired loss of fluid from the fluid chamber. This leakage, in turn, reduces the pressure that is applied by the captive liquid against its side of the diaphragm whereby the diaphragm will then have a tendency to be moved by the pressure of the process fluid under measurement into solid engagement with its backup plate. Since the diaphragm is then no longer in a flexible state it is not capable of accurately transmitting changes in pressure of the process fluid under measurement to the strain gauge.

Additionally, in prior art transmitters the diaphragm and diaphragm backup plate are often exposed to the process fluid which necessitates making them from a non-corrosive and expensive metal rather than made out of a mild steel since some process fluid under measurement can corrode mild steel. The use of such corrosion-resistant materials in combination with a mild-steel body for the transmitter is a source of further leakage at the interface using conventional seals due to the differential thermal expansion of such dissimilar materials.

SUMMARY OF THE INVENTION

It is an object of the invention to provide an improved pressure to current transmitter.

It is another object of the invention to provide an improved pressure to current transmitter having a welded seal for the fluid chamber to insure retention of the captive fluid.

It is a further object of the invention to provide an improved pressure to current transmitter having unitary welded fluid chamber and diaphragm backup plate construction that allows a proper operation of a diaphragm over a wide temperature range.

In accomplishing these and other objects, there has been provided, in accordance with the present invention, a pressure to current transmitter having an integral cantilever ring formed on an internal surface thereof surrounding the fluid chamber and the diaphragm backup plate. A continuous fluid tight welded seam joint is located between the ring and a peripheral edge of the diaphragm backup plate. The diaphragm is attached at its peripheral edge to the backup plate to form a fluid-tight seal inwardly of the welded seam to complete the sealing of the captive fluid in the fluid chamber.

BRIEF DESCRIPTION OF THE DRAWINGS

A better understanding of the present invention may be had from the following detailed description when read in connection with the accompanying drawings in which.

DESCRIPTION OF A PREFERRED EMBODIMENT

Figure 1:
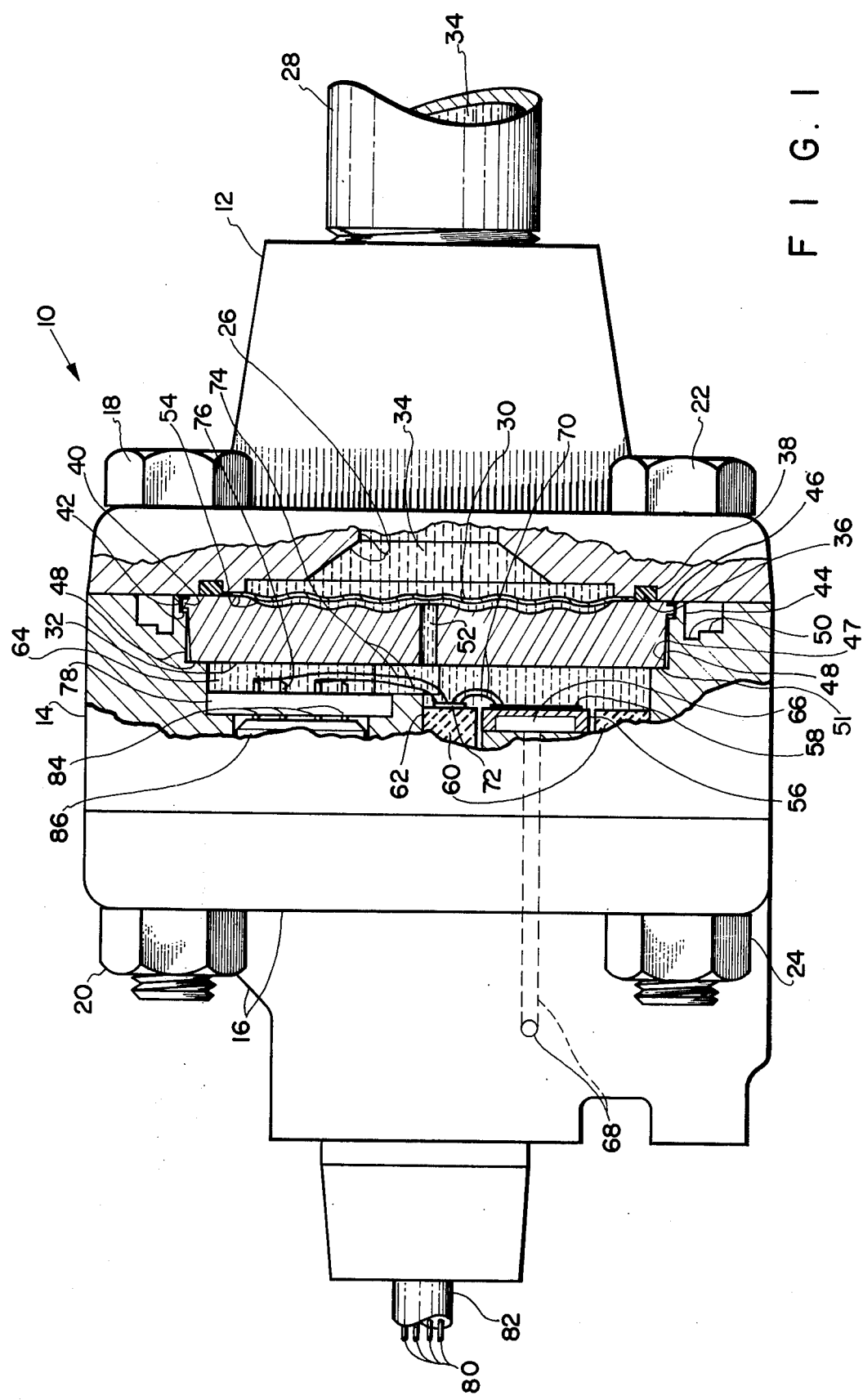
FIG. 1 is a partial section of a process pressure to current transmitter embodying the present invention and showing a diaphragm, a diaphragm backup plate and part of the transmitter body.

Referring now to FIG. 1 there is shown a process pressure to current transducer 10 consisting of three major portions, or subassemblies, namely, a process head portion 12, a central body portion 14 and a base, or end, portion 16 which are held together in a stacked relationship by a suitable number of connectors, e.g., bolts 18 and 22 and corresponding nuts 20 and 24.

The head portion 12 has an inner chamber 26 therein that extends through the head portion 12 to communicate with both ends of the head portion 12. A process fluid supply conduit 28 is connected by a fluid-tight connection, e.g., a threaded connection, to a first end of the head portion 12. The other end of the head portion is arranged as a cylindrical abutment surrounding the chamber 26 and in contact with the body portion 14. The open end of the chamber 26 is sealed by a convoluted disc-shaped diaphragm 30 which is attached along its circumference by a suitable method, e.g., electron-beam welding, to a disc-shaped backup plate 32. The backup plate 32 and diaphragm 30 are generally made of a relatively expensive corrosive resistant metal, such as Monel, stainless steel, etc. while the body portion 14, is usually made of a cheaper material, e.g., mild steel. These corrosion resistant metals tend to expand, when they experience an increase in ambient temperature, at a faster rate than the body portion 14 and tend to contract at a faster rate than the body portion 14 when they experience a decrease in ambient temperature. On the other hand, in some applications, the corrosive action of the particular process fluid may be such that it is necessary to use other types of corrosive resistant material, such as Hastalloy for the diaphragm 30 and backup plate 32. Such materials expand and contract at a slower rate than the body portion 14 in response to increases and decreases in ambient temperature.

A process fluid 34 is supplied under pressure through conduit 28 to the chamber 26 where it is applied to one side of the diaphragm 30.

An annular fluid-tight seal 36 is retained in an annular recess 38 in the face cylindrical abutment of the head portion 12. The seal 36 is arranged to contact the backup plate 32 outwardly of the edge of the diaphragm 30. The diaphragm backup plate 32 has an radially extending annular lip 40 to form the outer peripheral surface thereof. The lip 40 mates with a step, or recess, 42 of a cantilever annular ring 44 extending outwardly from a face of the body portion 14. Thus, the ring 44 is arranged to surround the outer edge of the backup plate 32.

Figure 2:
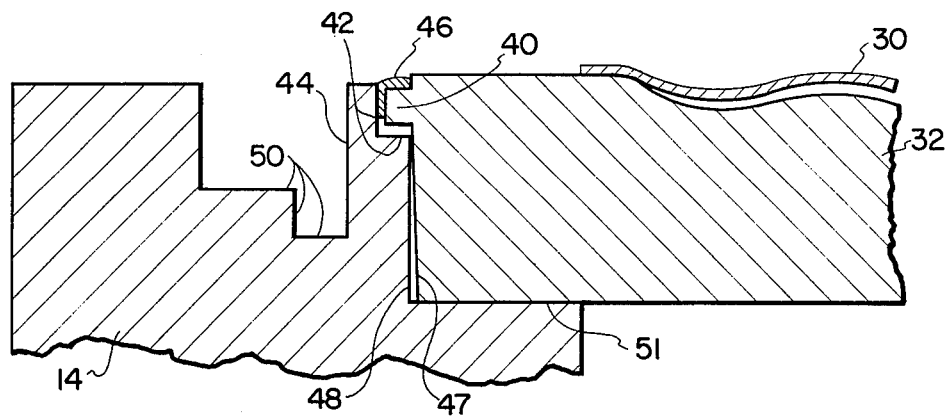
FIG. 2 shows a partial cross-sectional view of the cantilever seal ring used in the transmitter shown in FIG. 1 and connected by a seam weld to a diaphragm backup plate during a normal ambient temperature operating condition.

Referring now to FIG. 2 for more detail, the lip 40 of backup plate 32 is connected to the recess 42 of the ring 44 by means of a suitable seam weld bead 46. The periphery 47 of the disc shaped backup plate 32 below the lip 40 is a tapered surface extending away from an inner wall 48 below the recess 42 in the ring 44. The taper of the periphery 47 is arranged to progressively separate the periphery 47 from the wall 48 with the point of closest approach being located at the bottom of the recess 42 in the ring 44. This point can be either an actual contact to provide press fit between the plate 32 and the ring 44 or a small separation to provide a slip fit between the plate 32 and the ring 44. The step 42 is provided beneath the weld bead 46 to prevent any extraneous weld material from entering the tapered space between backup plate 32 and the wall 48 which would prevent proper operation of the present invention, as described hereinafter. The center of the body 14 is arranged to form a hollow chamber below the backup plate 32 with an inwardly extending step 51 located at the other end of the wall 48 from the recess 42. The step 51 is arranged to extend a short distance beneath an inner face of the backup plate 32 to provide a support for the backup plate 32. The remainder of the inner face of the plate 32 is exposed hollow chamber formed in the interior of the body 14. The cantilever ring 44 may be formed by machining out an annular groove 50 behind the ring 44 in the upper surface of the body portion 14.

The diaphragm backup plate 32 has a fluid passageway 52 extending transversely between the inner face of the backup plate 32 and an outer face located beneath the diaphragm 30. The outer face of backup plate 32 has a convoluted surface 54 similar to the convolutions of the diaphragm 30 in order to provide an approximately uniform separation from the diaphragm 30 to achieve a desired maximum movement of the diaphragm 30 without physical contact with the backup plate 32.

A pressure sensor 56, which may be silicon material into which has been diffused a resistive Wheatstone bridge pattern 58, is mounted on an refractory chassis 60 positioned beneath the backup plate 30 within the body 14. The chassis 60 is retained in a fixed position by any suitable means on a wall 62 that surrounds the chassis 60 and which forms a fluid-tight end for the chamber within the body 14. An electrically nonconductive liquid 64 of a preselected volume is used to fill the space between the diaphragm 30 and the convoluted surface 54, the space in the passageway 52 and the space between the inner face of the diaphragm backup plate 32 and the hollow chamber within the body 14. The chassis 60 may have its underside vented to the atmosphere by passageway 68 to allow the elements of the bridge pattern to respond to changes in pressure of the liquid 64. Electrical connections to the bridge pattern 58 are made by a terminal 72 and fine electrical conductors 74. The conductors 74 are connected to pin terminals 76 of feedthrough header 78 forming a fluid-tight seal with the wall 62.

External electrical leads 80 which may be in the form of a flexible cable 82 are connected to the lower multipin connections 84 of the feedthrough header 78 through an insulator 86 and the hollow base portion 16.

MODE OF OPERATION

PRESSURE TRANSMITTER OPERATION UNDER A NORMAL AMBIENT TEMPERATURE CONDITION

A process fluid 34 whose pressure is to be transduced into an equivalent electrical output signal for transmission is applied by way of conduit 28 and the chamber 26 in the head portion 12 to the outer side of the diaphragm 30. An increase in the pressure of the process fluid 34 causes the diaphragm 30 to move toward the convoluted surface 54 of the diaphragm backup plate 32 and thereby affect a compression of the nonconductive fill liquid 64 against the pressure sensor 56 and vice versa. The bridge 58 of the pressure sensor 56 generates an electrical output signal whose magnitude is proportional to the magnitude of the pressure of the process fluid under measurement. The electrical signal is then transmitted by conductors 70, the conductor leads 74, the pins 76, header 78, pins 84 and by the electrical conductors in the flexible cable 82 to a utilization device which will indicate the pressure of the process fluid 34.

When the process fluid is an acid, a caustic (alkaline) or some other corrosive fluid of strong concentration it has a tendency to destroy ordinary metals by corrosion, and it is then necessary to make the metal parts of the transmitter, i.e., especially the diaphragm 30 and backup plate, that contacts such active fluids of corrosive resistant materials, e.g., Monel, stainless steel, etc. Such materials have a different rate of thermal expansion and contraction than the material, e.g., mild steel, from which the body portion 14 and its associated integral cantilever ring 44 is constructed. The diaphragm 30 and the backup plate 32 are usually made of the same material to avoid temperature induced motions therebetween. In order to avoid a leakage of the fill fluid 64 in a structure combining such different materials, the transmitter of the present invention is arranged to accommodate a differential temperature expansion between the backup plate 32 and diaphragm 30 unit and the body 14 of the transmitter 10. Specifically, the backup plate 32 is welded to an integral flexible ring 44 in the body 14 whereby a fluid-tight seal is formed by the weld bead 46 while allowing a flexible connection to be maintained by the flexing of the ring 44.

Under normal ambient temperature operating conditions, as illustrated in FIG. 2, no stresses will be introduced into the welded bead 46 that is formed between the ring 44 and the backup plate 32. In other words, under these normal ambient temperature operating conditions only a very slight difference in expansion will be exhibited between the different materials used for the backup plate 32 and the body portion 14. The cantilever ring 44 will, therefore, be maintained in a substantially straight configuration. Since the cantilever ring 44 normally extends straight up from the body portion 14 with which it forms an integral part, no stress will be introduced into the weld bead 44.

PRESSURE TRANSMITTER OPERATION UNDER A HIGH AMBIENT TEMPERATURE

During an increase in the ambient temperature of the transmitter 10 from the previously described normal ambient temperature condition to a higher ambient temperature condition the metal from which the highly corrosive resistent backup plate 32 is made may expand at a faster rate in a radial direction than the mild steel material from which the body part 14 and ring 44 is constructed. The tapered edge of the plate 32 will accommodate the radial movement of the plate 32 and aid in forcing a bending of the ring 44 by concentrating the stress at the weld bead 46. Under such conditions, the flexibility of the cantilever ring 44 allows the backup plate 32, the weld 46 and the ring 44 to move radially outward as a single unit from the position as shown in FIG. 2 to the position shown in FIG. 3 when these parts experience an increase in ambient temperature. The welded end of the ring 44 will, thus, be forced outwardly in a cantilever fashion to its bent position as shown in exaggerated form in FIG. 3 due to the resulting difference in rate of expansion between the backup plate 32 and the body 14.

If the corrosive resistant material that is selected for the backup plate 32 is made of a material having a lower coefficient of thermal expansion, an increase in ambient temperature will cause the plate 32 to expand outward at a slower rate than the body portion 14 to which the ring 44 is attached. This will cause the welded end of the ring 44 to be canted inwardly to the position shown in exaggerated form in FIG. 4 since the weld bead 46 follows the motion of the backup plate 32.

PRESSURE TRANSMITTER OPERATION UNDER A LOW AMBIENT TEMPERATURE CONDITION

Figure 4:
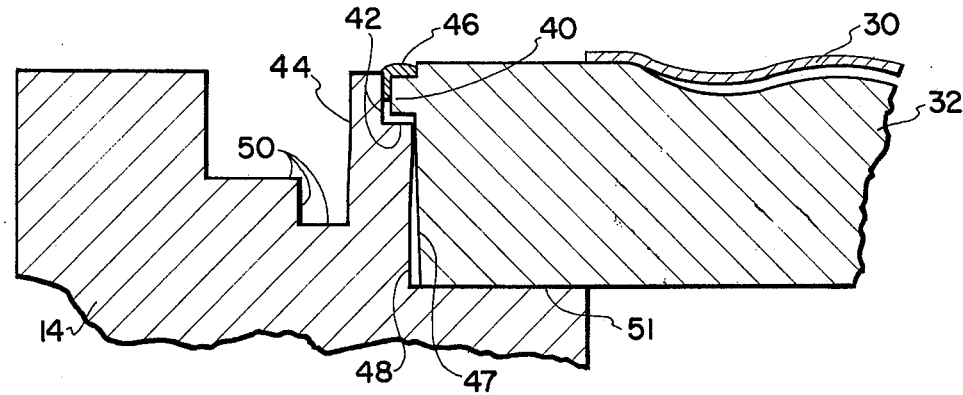
FIG. 4 shows a partial cross-sectional view of the cantilever seal ring and backup plate of FIG. 2 during a lower ambient temperature operating condition than that shown in FIG. 2.

During a decrease in the ambient temperature of the transmitter from its previous described normal ambient temperature condition to a lower ambient temperature condition and assuming the metal from which the backup plate 32 is made shrinks at a faster rate in a radial direction than the material from which the body portion 14 is constructed, the flexibility of the cantilever ring 44 allows the backup plate 32, the weld bead 46 and the ring 44 to move radially inward as a single unit from the position shown in FIG. 2 to the position shown in FIG. 4. The nonattached end of the ring 44 will thus be pulled inwardly in a cantilever fashion to its bent position as shown in FIG. 4 due to the resulting difference in coefficient of thermal expansion which occurs during the decrease in ambient temperature of the ring 44 and the backup plate 32.

Figure 3:
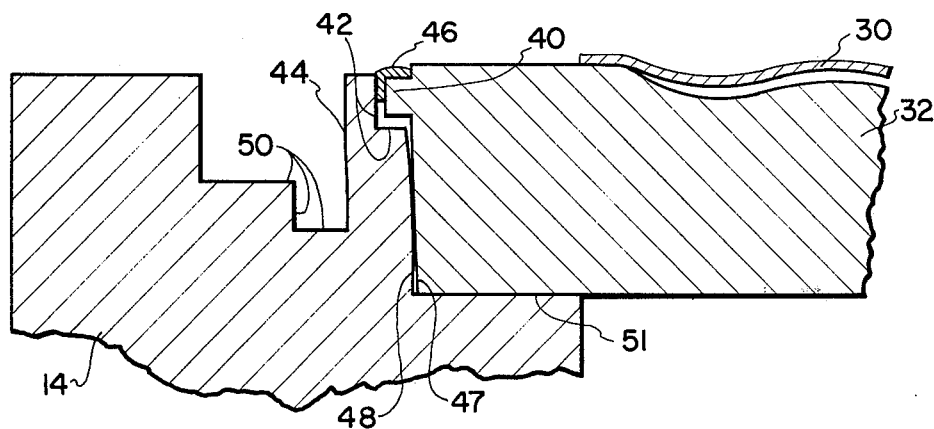
FIG. 3 shows a partial cross-sectional view of the cantilever seal ring and backup plate of FIG. 2 during a higher ambient temperature operating condition than that shown in FIG. 2

If the material selected for the backup plate 32 has a smaller coefficient of thermal expansion than the body 14, then a decrease in ambient temperature will cause the backup plate 32, weld bead 46 and plate 32 to move radially outward as a single unit in a cantilever fashion to the position shown in FIG. 3. This is due to the fact that a greater rate of contraction of the body portion 14 takes place than the rate at which the backup plate 32 is being contracted.

In summary, it can be seen that there has been provided by the present invention an improved seal for retaining a fill liquid in the fill chamber, or body portion, of a pressure to current transmitter while accommodating differential expansion between differing materials used in the fluid pressure retaining elements of the transmitter.

The embodiments of the invention in which an exclusive property or privilege is claimed are defined as follows:

1. A fluid-tight seal for connecting a body portion of a pressure transmitter to an associated diaphragm backup plate that has a different thermal coefficient of expansion than said body portion, comprising
    a free-standing ring integral with and extending from the body portion and positioned in a surrounding spaced relationship with said backup plate, and
    a welded joint extending between a surface at the free end of said ring and an adjacent surface of said backup plate, said free end of said ring being deflectable radially in a cantilever fashion upon said body portion by a force applied through said welded joint from said backup plate upon a change in ambient temperature.

2. A fluid-tight seal as set forth in claim 1 wherein said backup plate is of a substantially disc-shaped configuration.

3. A fluid-tight seal as set forth in claim 2 wherein said welded joint is located between an outer periphery of said backup plate and said ring.

4. A fluid-tight seal as set forth in claim 1 wherein said backup plate is spaced from said ring by a space having a tapered cross-section progressively increasing from the welded joint.

5. A fluid-tight seal as set forth in claim 4 wherein said backup plate has a frusto-conical cross-section with a center of revolution concentric with a center of said ring and said ring has a straight inside surface surrounding said backup plate.

6. A fluid-tight seal as set forth in claim 3 wherein said ring has an annular recess in its free end for mating with the adjacent surface of said backup plate to provide a location for said welded joint.

7. A fluid-tight seal as set forth in claim 1 wherein said backup plate has a lower coefficient of thermal expansion than said ring.

8. A fluid-tight seal as set forth in claim 1 wherein said backup plate has a higher coefficient of thermal expansion than said ring.

9. A pressure to current transmitter comprising
    a hollow process fluid inlet portion having an inlet end and an open end,
    a hollow body portion having an open end facing said open end of said inlet portion,
    a diaphragm,
    a backup plate supporting said diaphragm, across said open end of said inlet portion,
    a free-standing ring integral with and extending from said body portion as an extension of said open end and positioned in a surrounding spaced relationship with said backup plate, a welded joint extending between a surface at a free end of said ring and an adjacent surface of said backup plate, said free end of said ring being deflectable radially in a cantilever fashion upon said body portion by a force applied through said welded joint from said backup plate upon a change in ambient temperature, fluid passage means in said backup plate to provide a fluid passage from said open end of said body portion to a volume enclosed by said diaphragm and said backup plate and sensor means located in said body portion and arranged to detect changes in pressure of a fluid in said body portion communicating with said diaphragm in said volume by way of said fluid passage means.

10. A pressure to current transmitter as set forth in claim 9 wherein said backup is of a substantially disc-shaped configuration and said welded joint is located between an outer periphery of said backup plate and said ring.

* * * * *